United States Patent Office 3,305,590
Patented Feb. 21, 1967

3,305,590
DECOMPOSITION OF ALPHA HYDROPEROXY DERIVATIVES OF ALKYL SUBSTITUTED AROMATIC HYDROCARBONS
Ernest L. Pollitzer, Hinsdale, James J. Louvar, Riverside, and George E. Illingworth, Mount Prospect, Ill., assignors to Universal Oil Products Company, Des Plaines, Ill., a corporation of Delaware
No Drawing. Filed July 15, 1963, Ser. No. 295,189
10 Claims. (Cl. 260—621)

This invention relates to the decomposition of alpha hydroperoxy derivatives of alkyl substituted aromatic hydrocarbons to form a phenol. More particularly, this invention relates to the catalytic decomposition of cumen hydroperoxide to form phenol.

The manufacture of phenol through partial oxidation of cumene followed by acid decomposition of the resulting hydroperoxide, has been widely accepted in the industry. Acid decomposition is generally effected in the presence of an aqueous acid catalyst, usually 10–70% sulfuric acid in aqueous solution, or in the presence of an aqueous hydrochloric or perchloric acid solution. Prior to distillation of the decomposition reaction product to recover phenol, it is necessary to neutralize the aqueous acid catalyst contained therein, for example by treatment with aqueous alkali solution, and to separate the aqueous phase therefrom. This procedure is a cumbersome process adding to the complexity of a manufacturing process where optimum economy of operation is essential.

It is an object of this invention to present a novel method of decomposing the alpha hydroperoxy derivative of an alkyl substituted aromatic hydrocarbon and forming a phenol.

It is a further object to present a new and useful catalyst with respect to decomposition of the alpha hydroperoxy derivative of an alkyl substituted aromatic hydrocarbon.

One of the more specific objects of this invention is to present a method of decomposing cumene hydroperoxide and forming phenol, which method obviates the aforesaid disadvantages relating thereto.

In one of its broad aspects, this invention embodies a method of decomposing the alpha hydroperoxy derivative of an alkyl substituted aromatic hydrocarbon and forming a phenol, which method comprises heating said hydroperoxy derivative in contact with a catalytic composite consisting of silica and alumina and comprising from about 60% to about 95% silica.

Another embodiment of this invention is in a method of decomposing the alpha hydroperoxy derivative of a secondary alkylbenzene and forming a phenol, which method comprises heating said hydroperoxy derivative in contact with a catalytic composite consisting of silica and alumina and comprising from about 70 wt. percent to about 90 wt. percent silica.

A specific emobdiment of the present invention relates to the decomposition of cumene hydroperoxide to form phenol and comprises heating said hydroperoxide at a temperature of from about 50° C. to about 200° C. in contact with a catalytic composite consisting of silica and alumina and comprising from about 70 wt. percent to about 90 wt. percent silica.

Other objects and embodiments of the present invention will become apparent in the following detailed specification.

The alpha hydroperoxy derivatives of alkyl substituted aromatic hydrocarbons herein contemplated may be represented by the general formula

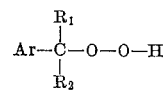

wherein Ar represents an aromatic hydrocarbon radical which may be an aryl radical or an alkaryl radical, and the hydroperoxy group (—O—O—H) is attached to a carbon atom alpha to the aromatic nucleus, and $R_1$ and $R_2$ may be hydrogen or the same or different alkyl, cycloalkyl, aryl, aralkyl, or alkaryl hydrocarbon radicals, or $R_1$ and $R_2$ together with the said alpha carbon atom to which they are attached may form a cycloalkyl group containing up to about eight carbon atoms, for example, as in the case of 1-phenyl-1-hydroperoxycyclohexane. $R_1$ and $R_2$ are preferably n-alkyl hydrocarbon radicals so that the hydroperoxide is an alpha hydroperoxy derivative of a secondary alkyl aromatic hydrocarbon, more preferably an alpha hydroperoxy derivative of a secondary alkyl benzene. Suitable alpha hydroperoxy derivatives of alkyl substituted aromatic hydrocarbons thus include benzyl hydroperoxide,
alpha-methylbenzyl hydroperoxide,
alpha-methyl-p-methylbenzyl-hydroperoxide,
alpha,alpha-dimethylbenzyl hydroperoxide (cumene hydroperoxide),
alpha,alpha-dimethyl-p-methylbenzyl hydroperoxide,
alpha-alpha-dimethyl-p-ethylbenzyl hydroperoxide,
alpha,alpha,alpha',alpha'-tetramethyl-p-xylyl dihydroperoxide,
alpha-methyl-alpha-phenylbenzyl hydroxoide,
alpha,alpha-dimethylnaphthylmethyl hydroperoxide, etc.

In accordance with the method of this invention, decomposition of the above-described alpha hydroperoxy derivatives of alkyl substituted aromatic hydrocarbons to form a phenol is effected in contact with a catalytic composite consisting of silica and alumina. It has been observed, and will become apparent with reference to the appended examples, that silica per se, and also alumina per se, is substantially completely inoperative with respect to effecting decomposition in the manner herein contemplated. However, it has been discovered that when silica and alumina are composited in a manner whereby silica comprises from about 60% to about 95% of the composite, a highly active decomposition catalyst results. Catalysts consisting of silica and alumina in a ratio other than described are substantially completely inoperative or inoperative for all practical purposes. One preferred embodiment of this invention relates to a decomposition catalyst consisting of silica composited with alumina wherein the silica comprises from about 70% to about 90% of the composite.

The silica-alumina composite herein contemplated is preferably a synthetically prepared composite characterized by a high surface area, i.e., a surface area of at least 100 square meters per gram. The surface area herein referred to is determined by the B.E.T. method proposed by Brunauer, Emmet and Teller in the Journal of the American Chemical Society, volume 60, page 309, dated 1938. A silica-alumina composite containing a surface area of from about 300 to about 600 square meters per gram is preferred. The silica-alumina composite herein employed may be prepared by conventional methods known to the art. One such method comprises coprecipitation or cogellation of silica and alumina from a common solution. For example, aqueous solutions of sodium silicate (common water glass) and aluminum sulfate are mixed together and sufficient acid, such as hydrochloric or sulfuric acid, is added thereto to form a precipitate or gel. Another method comprises impregnating a silica gel with a suitable aluminum compound which is subsequently convertible to alumina. For example, aluminum hydroxide is precipitated from an aqueous solution of a suitable aluminum salt, such as aluminum sulfate, in the presence of silica-gel immersed in the solution. The resulting composite is thereafter heated at elevated temperature and the impregnated hydroxide converted to alumina by thermal decomposition. Alternatively, the silica gel can be impregnated with a decomposable aluminum salt which will form alumina on subsequent heating. Aluminum nitrate is suitable for this purpose and can be impregnated on the silica gel by immersing the gel in an aqueous solution of said aluminum nitrate.

The composite of silica and alumina prepared by methods such as are set out above, is generally water washed to remove soluble salts therefrom and thereafter dried, usually at a temperature of from about 95° C. to about 200° C. The composite is thereafter subjected to calcination at a temperature of at least 475° C., and generally at a temperature of at least 475° C., to about 800° C. A particularly preferred temperature is in the range of from about 600° C. to about 700° C. Calcination can be effected in any suitable atmosphere. Usually calcination is effected in the presence of air or other oxidizing media although calcination may also be effected in a reducing atmosphere such as hydrogen, or an inert atmosphere such as nitrogen.

The silica-alumina composite can be utilized in a powdered form or as granules of varied size and shape. However, it is generally preferred to form the composite into particles of definite size and shape, either prior to or subsequent to calcination. One suitable method of forming or shaping the silica-alumina composite comprises commingling a powdered form thereof with a suitable pelleting agent such as hydrogenated vegetable oil, graphite, etc., and compressing the same into pellets. The silica-alumina may also be formed into the desired shape by extrusion methods, etc. A particularly satisfactory method relates to the preparation of spheres and comprises preparing a sol, for example, by coprecipitating silica and alumina from an aqueous solution, and discharging the sol by means of a nozzle or a rotating disc into a water immiscible suspending medium such as oil, and forming firm gel particles on passage therethrough. The spheres thus formed may be removed from the suspending medium in any suitable manner, such as by a stream of water disposed beneath the water immiscible suspending medium, and thereafter dried and calcined as above described.

The method of this invention may be carried out in any conventional or otherwise convenient manner and may comprise a batch or continuous type of operation. For example, in a batch type of operation, the catalyst is located in a suitable reaction vessel and the reaction mixture resulting from the partial oxidation of the alkyl substituted aromatic hydrocarbon and comprising said hydrocarbon and a phenol, is added thereto at a measured rate determined by the exothermic heat of reaction. The reaction mixture is stirred in contact with the catalyst until substantially all of the hydroperoxide has been decomposed. The reaction mixture is thereafter decanted or filtered from the catalyst and subjected to product separation by any conventional means.

The method of this invention is preferably effected in a continuous manner whereby a reaction mixture, resulting from the partial oxidation of an alkyl substituted aromatic hydrocarbon and comprising said hydrocarbon and the alpha hydroperoxy derivative thereof, is continuously charged to a suitable reactor containing a fixed bed of catalyst disposed in a reaction zone therein, or the catalyst may be maintained in said reaction zone in a state of turbulence under hindered settling conditions. The reaction zone is suitably equipped with cooling means to maintain the decomposition reaction temperature below about 200° C., and preferably at a temperature of from about 50° C. to about 100° C. The optimum temperature is determined in any particular case by the catalyst employed and the hydroperoxide being treated. Pressure is not considered to be an important variable with respect to the decomposition reaction and may be a reduced pressure, atmospheric pressure, autogenous pressure developed during the course of the reaction, or such as is considered necessary to effect a process flow. The reactor effluent is withdrawn at a rate which will insure substantially complete decomposition of the hydroperoxide. The decomposition reaction mixture is recovered, cooled, and subjected to product separation means, for example fractional distillation. The catalyst of this invention obviates the necessity of neutralizing the decomposition reaction mixture, separating an aqueous phase therefrom, and also obviates product loss in an aqueous phase or the necessity of recovery of product therefrom.

The following examples are presented in further illustration of the method of this invention and specific embodiments relating thereto. It is not intended that said examples be interpreted as an undue limitation on the generally broad scope of this invention as set out in the appended claims.

*Example I*

Forty-two grams of a 72% solution of cumene hydroperoxide in cumene was added to a stirred suspension of 1 gram of catalyst in 105 grams of cumene located in a 300 cubic centimeter glass reaction vessel equipped with an overhead reflux condenser. The catalyst was in a powdered form and consisted of silica composited with alumina, the silica comprising 75% of the catalyst composite. The temperature of the reaction mixture was about 68–70° C. during the course of the decomposition reaction. The reaction mixture was sampled at regular intervals and the hydroperoxide content thereof was determined iodometrically. At the expiration of 2 hours' reaction time the catalyst was filtered from the reaction mixture which was thereafter subjected to gas-liquid chromatography analysis. Decomposition of the hydroperoxide was complete. About a 92% yield of phenol based on the cumene hydroperoxide charged was obtained. The specific reaction-rate constant, or velocity constant, calculated for this first-order reaction, indicated decomposition of the hydroperoxide at an average rate of about 1.5% per minute.

*Example II*

Cumene hydroperoxide was treated in the manner and under the conditions described in Example I with the exception that silica was substituted for the silica-alumina catalyst therein described. The reaction mixture was sampled at regular intervals and the hydroperoxide content thereof was determined iodometrically. At the expiration of 2 hours' reaction time the catalyst was filtered from the reaction mixture which was thereafter subjected to analysis by gas-liquid chromatography methods. No decomposition reaction product of cumene hydroperoxide was detected.

*Example III*

Cumene hydroperoxide was treated in the manner and under the conditions described in Example I with the exception that alumina was substituted for the silica-alumina catalyst therein described. The reaction mixture was sampled at regular intervals and the hydroperoxide content thereof was determined iodometrically. At the expiration of 2 hours' reaction time, the catalyst was filtered from the reaction mixture which was thereafter subjected to analysis by gas-liquid chromatography methods. No decomposition reaction product of cumene hydroperoxide was detected.

*Example IV*

Cumene hydroperoxide was treated in the manner and under the conditions described in Example I with the exception that a catalyst consisting of silica composited with alumina and comprising 37% silica was substituted for the silica-alumina catalyst therein described. The reaction mixture was sampled at regular intervals and the hydroperoxide content thereof was determined iodometrically. At the expiration of 3 hours reaction time the catalyst was filtered from the reaction mixture which was thereafter subjected to analysis by gas-liquid chromatography methods. Only about 12% of the hydroperoxide charge had been decomposed. About a 10% yield of phenol, based on the amount of cumene hydroperoxide charged was obtained. The specific reaction-rate constant, or velocity constant, calculated for this first-order reaction indicates decomposition of the hydroperoxide at an average rate of about .06% per minute.

*Example V*

Cumene hydroperoxide was treated in the manner and under the conditions described in Example I with the exception that a catalyst consisting of silica composited with alumina and comprising 63% silica was substituted for the silica-alumina catalyst therein described. The reaction mixture was sampled at regular intervals and the hydroperoxide content thereof was determined iodometrically. At the expiration of 3 hours reaction time the catalyst was filtered from the reaction mixture which was thereafter subjected to analysis by gas-liquid chromatography methods. About 45% of the hydroperoxide had been decomposed, about 35% yield of phenol based on the cumene hydroperoxide charged being obtained. The specific reaction-rate constant, or velocity constant, calculated for this first-order reaction, indicates decomposition of the hydroperoxide at an average rate of about 0.27% per minute.

*Example VI*

Cumene hydroperoxide was treated in the manner and under the conditions described in Example I with the exception that a catalyst consisting of silica composited with alumina and comprising 88% silica was substituted for the silica-alumina catalyst therein described. The reaction mixture was sampled at regular intervals and the hydroperoxide content thereof was determined iodometrically. At the expiration of 2 hours reaction time the catalyst was filtered from the reaction mixture which was thereafter subjected to analysis by gas-liquid chromatography methods. Decomposition of the hydroperoxide was complete. About a 92% yield of phenol based on the cumene hydroperoxide charged was obtained. The specific reaction-rate constant, or velocity constant, calculated for this first-order reaction indicates decomposition of the hydroperoxide at an average rate of about 1.2% per minute.

Comparative analysis of the foregoing examples will serve to illustrate that silica per se, as well as alumina per se, is substantially completely inoperative with respect to the decomposition reaction herein contemplated; that silica composited with alumina in a ratio as described in this invention, whereby silica comprises from about 60% to about 95%, and preferably from about 70% to about 90% of silica-alumina composite, forms a highly active decomposition catalyst; and that silica composited with alumina in a ratio other than herein described is substantially completely inoperative, or inoperative for all practical purposes.

*Example VII*

In the decomposition of alpha,alpha-dimethyl-p-methylbenzyl hydroperoxide to form p-cresol, about 0.2 mole of the said hydroperoxide is prepared in solution with about 0.1 mole of p-cymene and added by means of a dropping funnel to a stirred suspension comprising about 1 gram of powdered catalyst and approximately 0.9 mole of p-cymene located in a 300 cubic centimeter reaction vessel equipped with an overhead reflux condenser. The reaction vessel is maintained at a temperature of about 60–80° C. and the hydroperoxide addition is effected over a period of about 2 hours. The catalyst consists of silica composited with alumina and comprises 75% silica. The reaction mixture is separated from the catalyst by filtration. The reaction mixture is distilled to give acetone, p-cresol, and p-cymene. A p-cresol yield in excess of about 90% based on the hydroperoxide charged, is recovered.

*Example VIII*

In the decomposition of alpha,alpha,alpha′,alpha′-tetramethylxylyl dihydroperoxide to form resorcinol, about 0.2 mole of the said dihydroperoxide is prepared in solution with about 0.1 mole of p-diisopropylbenzene and added by means of a dropping funnel to a stirred suspension comprising about 1 gram of powdered catalyst and approximately 0.9 mole of p-diisopropylbenzene located in a 300 cubic centimeter reaction vessel equipped with an overhead reflux condenser. The reaction vessel is maintained at a temperature of about 60–80° C. and the dihydroperoxide addition is effected over a period of about 2 hours. The catalyst consists of silica composited with alumina and comprises 75% silica. On completion of the decomposition reaction, the reaction mixture is separated from the catalyst by filtration. The reaction mixture is distilled to give acetone, resorcinol, and p-diisopropylbenzene. Resorcinol is recovered in excess of about a 90% yield based on the amount of dihydroperoxide charged.

*Example IX*

In the decomposition of benzyl hydroperoxide to form phenol, about 0.2 mole of the said hydroperoxide is prepared in solution with about 0.1 mole of toluene and added by means of a dropping funnel to a stirred suspension comprising about 1 gram of powdered catalyst and approximately .09 mole of toluene located in a 300 cubic centimeter reaction vessel equipped with an overhead reflux condenser. The reaction vessel is maintained at a temperature of about 60–80° C. and the hydroperoxide addition is effected over a period of about 2 hours. The catalyst consists of silica composited with alumina and comprising 75% silica. On completion of the decomposition reaction the reaction mixture is separated from the catalyst by filtration. The reaction mixture is distilled to give formaldehyde, phenol, and toluene. A phenol yield in excess of about 90% based on the benzyl hydroperoxide charged is recovered.

We claim as our invention:

1. A method of decomposing an alpha hydroperoxy derivative of an alkyl aromatic hydrocarbon and forming a phenol, which method comprises heating said hydroperoxy derivative in contact with a catalytic composite consisting of silica and alumina and comprising from about 60% to about 95% silica and having a surface area of at least 100 square meters per gram.

2. A method of decomposing an alpha hydroperoxy derivative of a secondary alkyl aromatic hydrocarbon and forming a phenol, which method comprises heating said hydroperoxy derivative in contact with a catalytic composite consisting of silica and alumina and comprising from about 60% to about 95% silica and having a surface area of at least 100 square meters per gram.

3. A method of decomposing an alpha hydroperoxy derivative of a secondary alkyl benzene and forming a phenol, which method comprises heating said hydroperoxy derivative in contact with a catalytic composite consisting of silica and alumina and comprising from about 60% to about 95% silica and having a surface area of at least 100 square meters per gram.

4. A method of decomposing an alpha hydroperoxy derivative of an alkyl aromatic hydrocarbon and forming a phenol, which method comprises heating said hydroperoxy derivative in contact with a catalytic composite consisting of silica and alumina and comprising from about 70% to about 90% silica and having a surface area of at least 100 square meters per gram.

5. A method of decomposing an alpha hydroperoxy derivative of a secondary alkyl aromatic hydrocarbon and forming a phenol, which method comprises heating said hydroperoxy derivatives in contact with a catalytic composite consisting of silica and alumina and comprising from about 70% to about 90% silica and having a surface area of at least 100 square meters per gram.

6. A method of decomposing an alpha hydroperoxy derivative of a secondary alkyl benzene and forming a phenol, which method comprises heating said hydroperoxy derivative in contact with a catalytic composite consisting of silica and alumina and comprising from about 70% to about 90% silica and having a surface area of at least 100 square meters per gram.

7. A method of decomposing cumene hydroperoxide and forming phenol, which method comprises heating the cumene hydroperoxide at a temperature of from about 50° C. to about 200° C. in contact with a catalytic composite consisting of silica and alumina and comprising from about 70% to about 90% silica and having a surface area of at least 100 square meters per gram.

8. A method of decomposing alpha,alpha-dimethyl-p-methylbenzyl hydrroperoxide and forming p-cresol, which method comprises heating said hydroperoxide at a temperature of from about 50° C. to about 200° C. in contact with a catalytic composite consisting of silica and alumina and comprising from about 70% to about 90% silica and having a surface area of at least 100 square meters per gram.

9. A method of decomposing alpha,alpha,alpha',alpha'-tetramethylxylyl hydroperoxide and forming resorcinol, which method comprises heating said hydroperoxide at a temperature of from about 50° C. to about 200° C. in contact with a catalytic composite consisting of silica and alumina and comprising from about 70% to about 90% silica and having a surface area of at least 100 square meters per gram.

10. A method of decomposing benzyl hydroperoxide and forming phenol, which method comprises heating said hydroperoxide at a temperature of from about 50° C. to about 200° C. in contact with a catalytic composite consisting of silica and alumina and comprising from about 70% to about 90% silica and having a surface area of at least 100 square meters per gram.

References Cited by the Examiner
UNITED STATES PATENTS

| | | | |
|---|---|---|---|
| 2,683,751 | 7/1954 | Filar | 260—621 |
| 2,718,530 | 9/1955 | Conner | 260—621 |

LEON ZITVER, *Primary Examiner.*

D. M. HELFER, W. B. LONE, *Assistant Examiners.*